United States Patent
Eddy et al.

(10) Patent No.: US 8,430,161 B2
(45) Date of Patent: Apr. 30, 2013

(54) MITIGATION OF ELEMENTAL SULFUR DEPOSITION DURING PRODUCTION OF HYDROCARBON GASES

(75) Inventors: Derry Eddy, Calgary (CA); Kean Zemlak, Calgary (CA)

(73) Assignee: BP Corporation North America Inc., Houston, TX (US)

(*) Notice: Subject to any disclaimer, the term of this patent is extended or adjusted under 35 U.S.C. 154(b) by 223 days.

(21) Appl. No.: 12/468,181

(22) Filed: May 19, 2009

(65) Prior Publication Data

US 2009/0288822 A1    Nov. 26, 2009

Related U.S. Application Data

(60) Provisional application No. 61/054,729, filed on May 20, 2008.

(51) Int. Cl.
*E21B 47/00* (2012.01)

(52) U.S. Cl.
USPC .................................. 166/250.05

(58) Field of Classification Search ........... 166/400, 166/401, 278, 270.11, 275
See application file for complete search history.

(56) References Cited

U.S. PATENT DOCUMENTS

| | | | |
|---|---|---|---|
| 3,393,733 A | 7/1968 | Kuo et al. | |
| 3,531,160 A | 9/1970 | Fisher et al. | |
| 3,545,916 A | 12/1970 | Deicher et al. | |
| 3,741,299 A | 6/1973 | Terral | |
| 3,744,565 A | 7/1973 | Brown et al. | |
| 3,846,311 A | 11/1974 | Sharp et al. | |
| 3,874,445 A | 4/1975 | Terral | |
| 3,909,422 A | 9/1975 | Sample, Jr. | |
| 3,913,678 A * | 10/1975 | Blount et al. | 166/310 |
| 4,230,184 A | 10/1980 | Blytas | |
| 4,239,082 A | 12/1980 | Terral | |
| 4,239,630 A | 12/1980 | Atkinson et al. | |
| 4,248,717 A | 2/1981 | Sharp et al. | |
| 4,290,900 A | 9/1981 | Sharp et al. | |
| 4,295,979 A | 10/1981 | Sharp et al. | |
| 4,395,385 A | 7/1983 | Welsh | |
| 4,460,627 A * | 7/1984 | Weaver et al. | 427/212 |
| 4,480,687 A * | 11/1984 | Terral | 166/117.5 |

(Continued)

FOREIGN PATENT DOCUMENTS

CA    1061996 A1    11/1979

OTHER PUBLICATIONS

Copyright 2010, Four Quest Energy—Sevices (http://www.fourquest.com/services/html).*

(Continued)

*Primary Examiner* — Terry Melius
*Assistant Examiner* — Silvana Runyan
(74) *Attorney, Agent, or Firm* — John L. Wood

(57) ABSTRACT

Methods of producing a sour hydrocarbon gas via production tubing intersecting a reservoir, are described, one method including contacting an underground reservoir with an aqueous composition optionally comprising an additive, the reservoir comprising hydrocarbons and sulfur compounds; displacing the composition into the reservoir by forcing a fluid (which may be a non-hydrocarbon gas, or inert gas, or nitrogen, or argon, or mixture thereof), into the reservoir, or into the production tubing; and producing at least some of the hydrocarbons and sulfur compounds from the reservoir through the production tubing, the composition wetting the production tubing and preventing substantial deposition of elemental sulfur thereon.

15 Claims, 2 Drawing Sheets

U.S. PATENT DOCUMENTS

| | | | |
|---|---|---|---|
| 4,543,193 A | | 9/1985 | Peter et al. |
| 4,601,836 A | * | 7/1986 | Jones .......................... 507/238 |
| 4,633,949 A | | 1/1987 | Crowe |
| 4,703,797 A | * | 11/1987 | Djabbarah ................ 166/252.1 |
| 4,710,305 A | | 12/1987 | Allison et al. |
| 4,728,447 A | | 3/1988 | Labat |
| 4,773,480 A | | 9/1988 | Paul |
| 4,773,483 A | | 9/1988 | Paul |
| 4,839,154 A | | 6/1989 | Allison et al. |
| 4,888,121 A | | 12/1989 | Dill et al. |
| 4,949,790 A | | 8/1990 | Dill et al. |
| 4,978,512 A | | 12/1990 | Dillon |
| 4,988,389 A | | 1/1991 | Adamache et al. |
| 5,028,343 A | | 7/1991 | Lindstrom |
| 5,085,274 A | * | 2/1992 | Puri et al. .................. 166/252.1 |
| 5,104,557 A | | 4/1992 | Lindstrom |
| 5,126,059 A | | 6/1992 | Williamson |
| 5,188,179 A | | 2/1993 | Gay et al. |
| H1147 H | | 3/1993 | Kennelley et al. |
| 5,203,413 A | * | 4/1993 | Zerhboub .................... 166/281 |
| 5,585,334 A | | 12/1996 | Shaw |
| 5,705,135 A | | 1/1998 | Deberry et al. |
| 6,196,021 B1 | | 3/2001 | Wissolik |
| 6,622,790 B1 | | 9/2003 | Hayhurst et al. |
| 6,832,653 B1 | | 12/2004 | Hayhurst et al. |
| 6,910,350 B2 | * | 6/2005 | Brigham et al. ................ 62/643 |
| 7,037,434 B2 | | 5/2006 | Myers et al. |
| 7,078,005 B2 | | 7/2006 | Smith et al. |
| 7,093,663 B1 | | 8/2006 | Bader |
| 7,198,106 B2 | | 4/2007 | Hayhurst et al. |
| 2004/0009880 A1 | * | 1/2004 | Fu ................................ 507/200 |
| 2007/0215347 A1 | * | 9/2007 | Tang ............................. 166/263 |

OTHER PUBLICATIONS

PCT International Search Report and the Written Opinion dated Aug. 20, 2009 for International Application No. PCT/US2009/044637.

PCT Preliminary Report on Patentability and Written Opinion of the International Searching Authority issued in International Application No. PCT/US2009/044637, mailed Dec. 2, 2010, 10 pages.

* cited by examiner

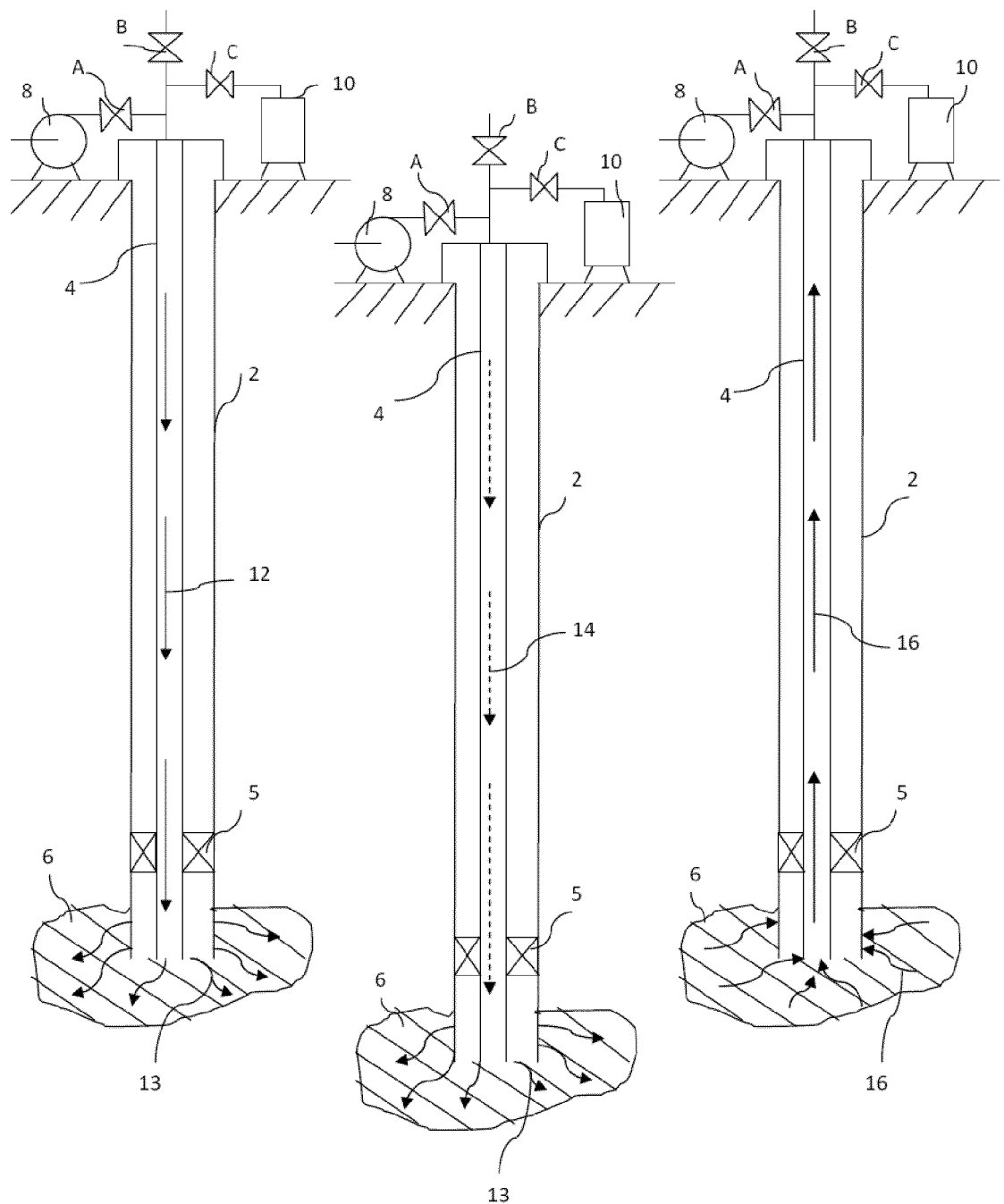

MITIGATION OF ELEMENTAL SULFUR DEPOSITION DURING PRODUCTION OF HYDROCARBON GASES

CROSS REFERENCE TO RELATED APPLICATIONS

This application claims priority, under 35 U.S.C. §119(e), of U.S. Provisional Application No. 61/054,729, filed May 20, 2008, which is hereby incorporated by reference in its entirety.

BACKGROUND INFORMATION

1. Technical Field

The present disclosure relates in general to methods for producing hydrocarbon gases from subterranean reservoirs, and more particularly to methods of preventing or lessening deposition of elemental sulfur in production tubing, valves, and other equipment during production of "sour" or "acid-gas" containing hydrocarbon fluids.

2. Background Art

Deposition of elemental sulfur in piping and other equipment during production of sour hydrocarbon gases from subterranean reservoirs is a well-known problem. Elemental sulfur is precipitated from the gas phase with the drop in pressure and temperature as the gas flow up the production tubing. Sulfur freezes at 117° C. (243° F.) into a solid/semi-solid that sticks to the tubing, plugging the tubing, which in turn affects and/or stops continual gas production.

In general, the solution in the past has been to inject various organic or inorganic solvents or solvent-containing fluids to dissolve the sulfur in the tubing (and in some cases dissolve sulfur in the reservoir), and remove the solid sulfur deposits. One such organic solvent is dimethyl disulfide (DMDS). Other dialkyl disulfides have been used. Solvents such as DMDS are very toxic chemicals with horrible odor and which therefore present health, safety, security, and environmental issues. Disposal of the toxic product is also very specific with a limited number of treatment centers which are able to manage the toxic products. The disposal is expensive and can be challenging to implement. The cost of solvent washes drastically increases operating costs, to the point that high production rate wells can actually become uneconomical to produce, leaving a large potential reserve of gas in the reservoir.

Another solution to the problem is to chemically react elemental sulfur with an aqueous solution capable of chemically reacting with sulfur to form a water-soluble sulfur derivative. However, as the elemental sulfur is oil-wetted and non-polar, these compositions have typically included an effective amount of a wetting agent or surfactant. U.S. Pat. No. 3,909,422 discloses use of solution of about 3 to about 50 percent (w/w) of an inorganic material reactive with sulfur selected from the group consisting of alkalies, sodium sulfite and sodium bisulfite and about 10 ppm nonionic surfactant wetting agent, or an aqueous solution of about 3 percent (w/w) to about 50 percent (w/w) sodium hydroxide and about 10 ppm to about 100 ppm of an ethylene oxide adduct of nonyl phenol.

Other United States patents include U.S. Pat. Nos. 4,290,900; 4,248,717; 4,239,630; 4,230,184; 5,585,334; 4,728,447; 5,028,343; 5,104,557; 4,543,193; 3,913,678; 4,248,717; 4,295,979; 4,633,949; 4,710,305; 4,773,480; 4,773,483; 4,839,154; 4,888,121; 4,949,790; 4,978,512; 3,909,422; 3,393,733; 3,531,160; 3,545,916; 3,744,565; 3,846,311; 4,988,389; 5,126,059; 5,188,179; H1,147; 5,705,135; 6,622,790; 6,832,653; 7,037,434; 7,978,005; 7,093,663; and 7,198,106.

There is a continuing, pressing need from the HSSE and economic standpoints to reduce the amount of chemical used in producing hydrocarbons. The methods of the present disclosure are directed to these pressing needs.

SUMMARY

In accordance with the present disclosure, methods of producing sour or acid hydrocarbon gases while preventing or reducing elemental sulfur deposition in the production tubing, tools, and surface equipment are presented which improve upon previous efforts in the field in that they are more economically sound and address one or more HSSE issues.

Methods of the invention comprise the use of aqueous compositions, comprising primarily water or brine optionally combined with additives to wet the production tubing internal walls. The tubing walls are metal and covered with a corrosion product of iron sulfide (FeS) which is polar in nature. This helps water to stick to the tubing walls preferentially over elemental sulfur. As sulfur repels water (especially on the tubing walls), and provided there is sufficient water in the production stream, elemental sulfur will not stick to the tubing walls. Therefore, sulfur cannot bridge off the tubing and/or flow path due to deposition.

Aqueous compositions described herein may be injected in numerous ways, for example through side pocket mandrels via a control line, or in the annulus (between the production tubing and wellbore casing). A continuous water production stream may also be generated by injection of an aqueous composition into the reservoir. In this method, hydrocarbon gas production is stopped temporarily, an aqueous composition is injected into the reservoir, and then the well is put back on production. The gas production carries the injected aqueous composition back into the wellbore over a period of time, and as the gas produces through the production tubing, the tubing remains "water wet" and clear of sulfur deposits. In certain methods described herein, one or more parameters may be monitored to determine if another aqueous composition treatment is indicated. These parameters may include: evidence of elemental sulfur deposition; temperature of the fluids exiting the well, reactivity of the fluids leaving the well, and the like.

Injection of aqueous compositions as described herein may provide other benefits, and the means of placing water into the well to effectively water-wet the tubing is not limited to the methods noted; other methods may be employed, such as batch treatments, injection subs placed in the wellbore to allow annular injection, ported flow sleeves, tubing inside of tubing wellbore designs, and any other method of placing water into the tubing and/or annulus allowing water to be pushed into the sour hydrocarbon gas flow stream. However, the use of water push using an inert gas, and the use of injection mandrels, may have multiple benefits.

A first aspect of the disclosure is a method of producing a sour hydrocarbon gas from a reservoir, the method comprising:

a) injecting an aqueous composition into a well within the reservoir so as to contact at least a portion of the reservoir with the aqueous composition, the well having an annulus and production tubing, and the reservoir comprising hydrocarbons and sulfur compounds;

b) injecting a fluid into the well to force the aqueous composition further into the reservoir; and c) producing at least some of the hydrocarbons and sulfur compounds mixed with the aqueous composition from the reservoir via the production tubing, the aqueous composition wetting the production tubing and preventing substantial deposition of elemental sulfur on to the production tubing.

Methods in accordance with this aspect include those methods wherein the aqueous composition consists essentially of water. The aqueous composition may optionally comprise one or more additives. In certain methods the aqueous composition may comprise a surfactant, an alkali salt, or both. In certain methods the surfactant is a non-ionic surfactant. In certain methods the displacing of the aqueous composition into the reservoir using a fluid comprises injecting an inert gas into the reservoir. In certain methods the producing step is carried out at conditions sufficient to produce a water-saturated, sour hydrocarbon gas stream with entrained free liquid water. Certain methods include shutting in the reservoir after displacing the aqueous composition into the reservoir. Yet other methods comprise monitoring the hydrocarbon gas being produced for one or more indications of elemental sulfur being deposited on the production tubing. Certain methods comprise repeating steps (a), (b) and (c) after the monitoring indicates substantial deposition of elemental sulfur. In yet other methods the contacting comprises injecting the composition into the reservoir through a conduit other than the production tubing. In certain methods the temperature of the aqueous composition is at least 35° C. during the contacting into the wellbore to stay at a temperature above which hydrates (such as methane hydrates) are incapable of forming, or have difficulty forming. In certain embodiments, and particularly when the reservoir temperature is above the melting point of sulfur, the aqueous composition is at a high enough surface injection temperature so that when it reaches the bottom hole, the temperature of the aqueous composition upon contact with the reservoir/tubing is above the melting point of sulfur to prevent freezing of elemental sulfur so that the water will mobilize the liquid sulfur and push it back further into the reservoir.

Another aspect of the invention is a method of producing a sour hydrocarbon gas from a reservoir, the method comprising:
 a) injecting an aqueous composition into a well within the reservoir so as to contact at least a portion of the reservoir with the aqueous composition, the well having production tubing, and the reservoir comprising hydrocarbons and sulfur compounds;
 b) injecting a fluid into the well to force the aqueous composition further into the reservoir;
 c) producing at least some of the hydrocarbons and sulfur compounds mixed with the aqueous composition from the reservoir, the aqueous composition wetting the production tubing and preventing substantial deposition of elemental sulfur on the production tubing;
 d) monitoring the hydrocarbon gas being produced for one or more indications of elemental sulfur being deposited on the production tubing; and
 e) repeating (a) through (c) after the monitoring in (d) indicates substantial deposition of elemental sulfur.

Methods within the first and second aspects include those methods wherein the fluid comprises nitrogen. In certain methods liquid nitrogen may be brought to the well location and vaporized. In certain other methods gaseous nitrogen is produced onsite using an onsite nitrogen generator, for example a membrane permeation unit, or adsorption unit. Membrane permeators and adsorption units both take air as feed and separate nitrogen from the air feed. Both are well-known in the industrial gas field.

Another aspect of the disclosure is a method of producing a sour hydrocarbon gas from a reservoir, the method comprising:
 a) providing a production tubing string comprising one or more mandrels, the production tubing string intersecting the reservoir comprising hydrocarbons and sulfur compounds;
 b) contacting the internal surfaces of the production tubing string with an aqueous composition using the one or more mandrels; and
 c) producing at least some of the hydrocarbons and sulfur compounds mixed with the aqueous composition from the reservoir, the aqueous composition wetting the internal surface of the production tubing string and preventing substantial deposition of elemental sulfur on the production tubing string.

These and other features of the methods of the disclosure will become more apparent upon review of the brief description of the drawings, the detailed description, and the claims that follow.

BRIEF DESCRIPTION OF THE DRAWINGS

The manner in which the objectives of this disclosure and other desirable characteristics can be obtained is explained in the following description and attached drawings in which:

FIGS. 1A, 1B, and 1C illustrate schematically a first method in accordance with the present disclosure.

Figure 2A:
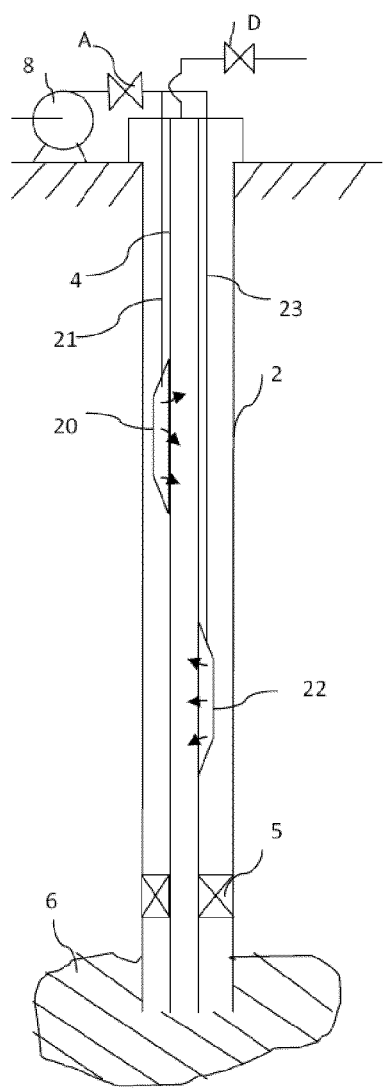
FIGS. 2A and 2B illustrate schematically a second method in accordance with the present disclosure.

It is to be noted, however, that the appended drawings are not to scale and illustrate only typical embodiments of this disclosure, and are therefore not to be considered limiting of its scope, for the invention may admit to other equally effective embodiments. Identical reference numerals are used throughout the several views for like or similar elements.

DETAILED DESCRIPTION

In the following description, numerous details are set forth to provide an understanding of the disclosed methods and compositions. However, it will be understood by those skilled in the art that the methods and compositions may be practiced without these details and that numerous variations or modifications from the described embodiments may be possible.

All phrases, derivations, collocations and multiword expressions used herein, in particular in the claims that follow, are expressly not limited to nouns and verbs. It is apparent that meanings are not just expressed by nouns and verbs or single words. Languages use a variety of ways to express content. The existence of inventive concepts and the ways in which these are expressed varies in language-cultures. For example, many lexicalized compounds in Germanic languages are often expressed as adjective-noun combinations, noun-preposition-noun combinations or derivations in Romantic languages. The possibility to include phrases, derivations and collocations in the claims is essential for high-quality patents, making it possible to reduce expressions to their conceptual content, and all possible conceptual combinations of words that are compatible with such content (either within a language or across languages) are intended to be included in the used phrases.

Figure 2B:
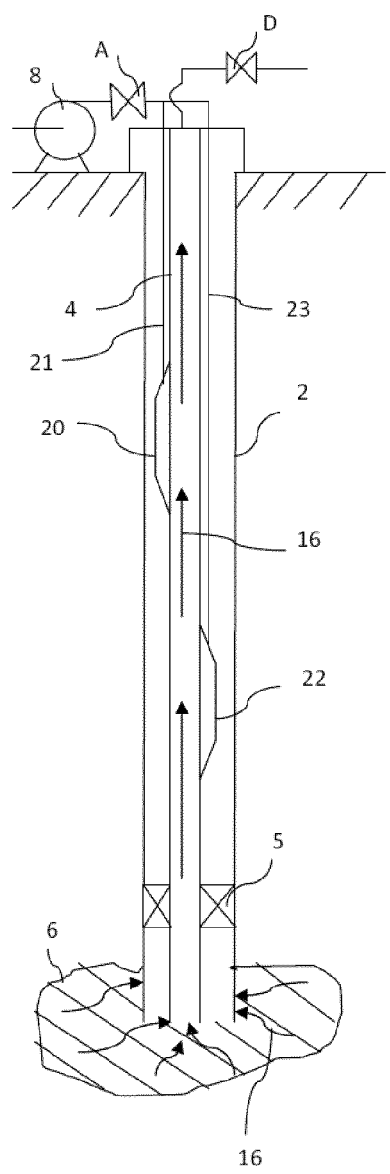

Referring now to the figures, FIGS. 1A, 1B, and 1C illustrate schematically a first method in accordance with the present disclosure. Illustrated schematically and not to scale is a well with a cased or uncased wellbore 2 and production tubing (i.e. production tubing string) 4 intersecting or located within a subterranean hydrocarbon gas-bearing reservoir 6. Also illustrated are a pump 8 and an inert gas generation unit 10. Valves A, B and C represent schematically a series of wellhead valves. FIG. 1A illustrates a first step of injecting an aqueous composition into the production tubing using pump 8, as depicted by arrows 12 and 13. If the wellbore 2 is a cased wellbore, the casing has been previously perforated using known means. During the step of pumping in the aqueous composition, valve A is open, and valves B and C are closed. Check valves and other flow control devices, not illustrated for clarity, would be included for safety purposes and to prevent cross-contamination of fluids. The aqueous composition may contact or enters at least a portion of the reservoir, and in certain methods may fill a portion of the annulus between tubing 4 and wellbore 2, depending on the pressure in the reservoir, depth, and other factors. Once sufficient aqueous composition has been flowed down the tubing, as may be determined empirically, by calculation, or combination of thereof, valve A is closed and pump 8 shut down. In another embodiment, one or more mandrels (as shown in FIG. 2A) may be used to inject the aqueous composition into the production tubing and the reservoir, FIG. 1B illustrates schematically the second step, where an inert gas such as nitrogen is caused to flow into tubing 2, as indicated by dashed arrows 14. The pressure and flow rate of inert gas may also be determined empirically, by calculation, or combination thereof. In any case, the pressure and flow rate should be sufficient to cause some or all of the aqueous composition to be forced into the reservoir, again as indicted by arrows 13. In this step, valves A and B are closed, and valve C is opened. In another embodiment, the fluid may also be injected or introduced through one or more mandrels 20, 22 such as are depicted in FIGS. 2A and 2B. Finally, FIG. 1C illustrates producing humid acid or sour hydrocarbon gas with entrained aqueous composition (e.g. free liquid water) from reservoir 6 through a "water-wet" production tubing 4, as indicated by arrows 16. In this step, valves A and C are closed, and valve B is open. The aqueous composition mixed with or entrained in the humid acid or sour hydrocarbon gas, serves to water-wet the internal surface of the tubing, which may be covered with a coating of FeS corrosion products.

FIGS. 2A and 2B illustrate schematically a second method in accordance with the present disclosure. Like components have like reference numerals in the various drawing figures. FIGS. 2A and B illustrate production tubing 4 having one or more (in the embodiment illustrated, two) injection mandrels 20, 22, each having their corresponding control line 21, 23, respectively. In operation, aqueous composition is pumped into control lines 21, 23 by pump 8 through open valve A while valve D is open or closed. Generally, valve D will be open as the aqueous composition is continuously injected, allowing the aqueous composition to flow back to surface inside production tubing 4, entrained or mixed with the sour hydrocarbon gas stream, continuing to water wet the tubing surface. The aqueous composition is injected into tubing 2 via injection mandrels 20, 22, as indicated by the short arrows internal to the mandrels. The flow rate and pressure of injection of the aqueous composition are such as to just wet the internal surface of tubing 4. As water and elemental sulfur do not wet each other, any element sulfur in produced acid or sour hydrocarbon gases produced through tubing 4 (FIG. 2B) will not stick to the internal tubing surfaces, reducing or preventing clogging of production tubing 4 and any component the hydrocarbon gases contact. Furthermore, a fluid such as an inert gas, as described above, may also be injected through the mandrels 20, 22 or production tubing 4 to further force the aqueous composition into the reservoir.

As an alternative to the method just described, rather than use of control lines, water and/or the aqueous composition could be injected into the annulus between tubing 4 and casing 2 and then enter the bore of production tubing 4 by one or more injection mandrels configured with tubing 4. The annulus above packer 5 is filled with water and/or the aqueous composition. The water and/or the aqueous composition would enter into the side pocket mandrel, injection sub, or anything else as originally stated once an injection valve setting (i.e. cracking pressure) is overcome.

Aqueous Compositions

In formulating the aqueous compositions useful in the methods described herein, water may be the primary component, and may be the only component in some embodiments. In some embodiments, a surfactant that helps water wet the internal surfaces of production tubing may be combined with water. The water may be a brine, in which case the water is salty and alkaline. A builder may be added in certain embodiments. A "builder" is a material that enhances or maintains the efficiency of surfactants and functions by inactivating water hardness, supplying alkalinity, providing buffering to maintain alkalinity, and preventing removed solids from redepositing. Any of the conventional builders may be used in the practice of the methods of this disclosure invention. These include silicates such as alkali metal silicates and metasilicates, alkali metal hydroxides, alkali metal carbonates, bicarbonates and sesquicarbonates, phosphates such as alkali metal phosphates, pyrophosphates, tripolyphosphates, hexametaphosphates and tetraphosphates, borax and alkali metal borates. Useful builders which may be used in the methods of the disclosure include sodium hydroxide, sodium metasilicate, sodium silicate ($Na_2O:2SiO_2$ or $Na_2O:3SiO_2$), sodium carbonate, sodium sesquicarbonate, sodium bicarbonate, borax, trisodium phosphate, tetrasodium pyrophosphate, sodium tripolyphosphate, sodium hexametaphosphate, sodium tetraphosphate, and sodium perborate. Other builders may be used. The builder component will generally constitute from approximately 0 to 10.0 wt. % of the total composition.

The amount of optional surfactant will vary depending upon the particular amount tubing surface and degree of wetting by the water desired, and may readily be determined by simple experimentation in each instance.

The surfactant, if used at all, may be an anionic, nonionic, cationic or amphoteric surfactant, and the use of anionic or nonionic surfactants is generally preferred. Illustrative anionic surfactants for use in the methods described herein include dodecylbenzene sulfonic acid, sodium dodecylbenzene sulfonate, potassium dodecylbenzene sulfonate, triethanolamine dodecylbenzene sulfonate, morpholinium dodecylbenzene sulfonate, ammonium dodecylbenzene sulfonate, isopropylamine dodecylbenzene sulfonate, sodium tridecylbenzene sulfonate, sodium dinonylbenzene sulfonate, potassium didodecylbenzene sulfonate, dodecyl diphenyloxide disulfonic acid, sodium dodecyl diphenyloxide disulfonate, isopropylamine decyl diphenyloxide disulfonate, sodium hexadecyloxypoly (ethyleneoxy)(10)ethyl sulfonate, potassium octylphenoxypoly(ethyleneoxy)(9) ethyl sulfonate, sodium alpha C12-14 olefin sulfonate, sodium hexadecane-1 sulfonate, sodium ethyl oleate sulfonate, potassium octadecenylsuccinate, sodium oleate, potassium laurate, triethanolamine myristate, morpholinium tallate, potassium tallate, sodium lauryl sulfate, diethanolamine lauryl sulfate, sodium laureth (3) sulfate, ammonium laureth (2) sulfate, sodium nonylphenoxypoly(ethyleneoxy)(4) sulfate, sodium diisobutylsulfosuccinate, disodium laurylsulfosuccinate, tetrasodium N-laurylsulfosuccinimate, sodium decyloxypoly(ethyleneoxy)(5)methyl)carboxylate, sodium octylphenoxypoly(ethyleneoxy)(8)methyl)carboxylate, sodium mono decyloxypoly(ethyleneoxy)(4)phosphate, sodium di decyloxypoly(ethyleneoxy)(6)phosphate, and potassium mono/di-octylphenoxypoly(ethyleneoxy)(9)phosphate. Other anionic surfactants known in the art may also be employed.

Among the useful nonionic surfactants which may be employed may be mentioned octylphenoxypoly(ethyleneoxy)(11)ethanol, nonylphenoxypoly(ethyleneoxy)(13)ethanol, dodecylphenoxypoly(ethyleneoxy)(10)ethanol, polyoxyethylene (12) lauryl alcohol, polyoxyethylene (14) tridecyl alcohol, lauryloxypoly(ethyleneoxy)(10)ethyl methyl ether, undecylthiopoly(ethyleneoxy)(12)ethanol, methoxypoly(oxyethylene(10)/(oxypropylene(20))-2-propanol block copolymer, nonyloxypoly(propyleneoxy)(4)/(ethyleneoxy)(16)ethanol, dodecyl polyglycoside, polyoxyethylene (9) monolaurate, polyoxyethylene (8) monoundecanoate, polyoxyethylene (20) sorbitan monostearate, polyoxyethylene (18) sorbitol monotallate, sucrose monolaurate, lauryldimethylamine oxide, myristyldimethylamine oxide, lauramidopropyl-N,N-dimethylamine oxide, 1:1 lauric diethanolamide, 1:1 coconut diethanolamide, 1:1 mixed fatty acid diethanolamide, polyoxyethylene(6)lauramide, 1:1 soya diethanolamidopoly(ethyleneoxy)(8) ethanol, coconut diethanolamide, "modified", and coconut diethanolamide, "long chain modified". Other known nonionic surfactants may likewise be used.

A combination of one or more compatible surfactants from the same or different classes of surfactants may be used, depending on their ability or synergistic ability to enhance water wetting of the internal production tubing. Thus, one may use a combination of blended surfactants to achieve the desired water wetting of production tubing. The compatibility of the various surfactants with each other and in combination can be readily determined by simple experimentation.

Mandrels

In certain embodiments, one or more side pocket injection mandrels may be used to wet the internal surface of the production tubing with the aqueous composition. Side pocket injection mandrels are known in the hydrocarbon production field. They are described, for example, in U.S. Pat. Nos. 3,741,299; 3,874,445; 4,239,082; and 4,480,687, the disclosures of which are incorporated herein by reference in their entirety. The '299 patent describes a mandrel for use in a well tubing in which the mandrel body has an open bore for alignment with the well tubing and a sidepocket offset from the open bore for receiving flow control devices, having a housing for protecting tools in the pocket, having a deflecting guide surface for preventing tools moving in the bore from catching in the mandrel, and being of an extent for receiving and guiding flow control devices into the sidepocket, being of a size to admit and guide only devices seatable in the pocket, and preventing the entrance of open bore tools into the pocket housing. A plurality of identical mandrels with orienting means in the open bore for aligning a flow control device into the housing and pocket with the guide receiving and guiding the flow control device toward and into the pocket. The '445 patent describes a sidepocket mandrel, for use in a well tubing, having more than one valve pocket. The valve pockets may include various positioned ports such as ports leading exteriorly of the mandrel, ports leading interiorly to the mandrel, ports extending between the valve pockets, and ports extending further downhole. The ports allow greater versatility so that the mandrel can provide various types of services for different types of downhole operations. An apparatus for selectively installing and removing various types of flow control devices into and from one of the valve pockets is also described.

Inert Gas

As noted herein, in certain embodiments it may be beneficial to force the aqueous composition into the reservoir using pressure of an inert gas, or some other gas. In certain embodiments, a step change in the temperature, pressure, or both of the inert gas in discrete steps, even though it may lengthen the time of the method, may be beneficial so that the reservoir sees higher temperatures and/or pressures at certain times.

The skilled operator or designer in each embodiment will likely determine after a short time how to achieve the highest efficiency without undue experimentation. This will primarily be obtained through adjustment of the various flow stream pressures, such as compressor suction and discharge pressures, as well as temperature changes observed for the various streams. Skilled operators and designers will be able to decide on the advantages/disadvantages of the various embodiments and options, for example, would a compressor system provide more efficiency than a single compressor, and which system pressure has the most influence on compressor efficiency (inert gas, recycle, or compressor discharge), and sizing of the compressor(s), and what operating variable is the system most sensitive to (pressure, temperature, velocity, mass flow). Compressors are typically sold in a variety of frame sizes, and with various automatic control systems. The skilled compressor artisan will be able to decide what frame sizes and control systems are most beneficial for a particular scenario so as to produce the greatest amount of inert gas. Typical automatic control strategies include feedback, feedforward, cascade, and the like, and may be implemented via computer, either on-site or at a more centralized location. Proportional, integral, and differential control strategies may be employed, or combination thereof, such as PID controllers.

The inert gas used in the methods described herein need not be completely devoid of reactant gases, as long as the placement in the reservoir and wetting of the production tubing by the aqueous composition during producing the hydrocarbon gas/aqueous composition mixture proceeds in a safe and expeditious manner. The inert gas may be nitrogen, argon, helium or mixtures thereof, and may consist essentially of nitrogen purified from an air separation plant. The air separation plant may be selected from cryogenic, adsorption (pressure-swing, vacuum-swing, and temperature swing adsorption units are commercially available), and membrane separation plants. In certain embodiments the inert gas is nitrogen.

Pipeline nitrogen has the benefit of being at a pressure especially suited for use in methods described herein, as it typically is already at or above the desired pressure.

In certain methods liquid nitrogen is brought out to the well location in a cryogenic pressurized tank, either on a pump truck itself or brought out in a separate bulker to feed into a liquid nitrogen pumping unit. The liquid nitrogen is pulled out of the tank, fed into a pump to pressurize and move the liquid through a heating device (which may be any heating device, such as an electric heater, heat exchanger using a heat transfer fluid (such as glycol), and the like) and continue onwards into the wellbore.

The inert gas component may advantageously be supplied via a pipeline at pipeline pressure in certain embodiments. As noted in U.S. Pat. No. 6,196,021, after being generated in a cryogenic air separation plant, nitrogen gas is typically transported down a pipeline under high pressure, typically 250 to 600 psig (1700 to 4100 kPa). The pressure for different systems will vary, but a pressure of 400 psig (2800 kPa) is a common pressure level seen in nitrogen pipelines. Current practice would have the nitrogen gas reduced in pressure through pressure regulator or regulators at a pressure letdown station to the customer's requirement, for example 150 psig (1000 kPa). Typically nitrogen gas streams produced cryogenically are substantially free of moisture and carbon dioxide, and have a nitrogen concentration greater than 99 volume percent, in certain embodiments greater than 99.9, or 99.99, or even 99.999 volume percent.

In other embodiments, the inert gas may be supplied by an on-site inert gas generator, such as a portable, skid-mounted membrane permeators or adsorption unit. These units are well-known for producing "on-site" nitrogen. In such "on-site" nitrogen generators, one or more compressors are used to compress air at a pressure greater than atmospheric pressure, typically several bar of pressure or higher. The compressed air, after filtration, water vapor removal, and possibly other operations known to the skilled artisan, is deliver as clean dry air containing, for example less than 1 ppm moisture (a dew point of 70° C. or less), less than 0.01 micron particulates and no detectable residual oil vapor, to the feed side of a membrane unit which includes a membrane of, for example, polyimide, polyamide, polyolefin, or other glassy polymer. On the non-permeate (feed) side of the membrane, a nitrogen enriched gas mixture is withdrawn which comprises less than about 5 percent (by volume) oxygen, and on the permeate side of the membrane (preferably, but not necessarily, the bore side) an oxygen enriched gas mixture at ambient or lower pressure is vented.

Adsorption-based systems may also be employed to supply inert gas. Known adsorption-based sources of nitrogen are a pressure-swing, vacuum-swing, and temperature swing adsorption units, which typically comprises two or more vessels containing an adsorbent material. When one adsorbent bed is "loaded", a control system switches or "swings" the feed air to the other vessel. In these embodiments, an air compressor is used to compress air at a pressure which is preferably at least equal to about 10 bar, prior to being filtered (first stages include preferably a water separator, coalescing and particulate filters and an activated carbon tower). Such nitrogen generators may comprise an oxygen sensor and an oxygen monitoring system, in order to monitor the oxygen content of the "impure" nitrogen gas generated. A surge tank may be connected between (or in parallel to) the generator and the inert gas preheater wherein the pressure may be maintained greater than the normal pressure for use of the nitrogen, usually about 10 bar or even more.

Appropriate membrane generators are for example those of the M 500 C. series of FLOXAL (a trademark of L'AIR LIQUIDE SA). Nitrogen membrane generators, as disclosed e.g. in the Tech Specs of such systems, incorporated therein by reference (those generators can usually provide nitrogen at different flow rates and different purities from about 95 volume percent inert gas to 99.5 volume percent inert gas).

EXAMPLE

A first field experiment was performed and results demonstrated on an operating gas well and reservoir. The results were evaluated and compared to previous practice consisting of DMDS solvent washes.

DMDS solvent washes were previously executed on the well and reservoir over a period of greater than 4 years. During this time, DMDS solvent wash frequency and the volume for DMDS (including the number of selected slugs on a single job) increased to a point where the well was no longer economic to produce. If one of the methods described according to this disclosure had not been implemented, the well would have been shut-in where up to 400 $e^3$ m$^3$/day (14 MMscf/day) and a resource size greater than 35 BCF would be economically locked in the reservoir.

The operation consisted of injecting water into the formation to push sulfur away from near the wellbore area and attempt to freeze it in a position in the reservoir. The water assisted in preventing extensive sticking of sulfur to the tubing wall, as gas carried the liquid streams to the surface, e.g. water preferentially wetted the surface versus sulfur.

In the absence of an available downhole injection mandrel/port, a water push was carried out with a volume of 100 m$^3$ (629 BBL) of water with an additive consisting of a non-ionic surfactant known under the trade designation EZEFLO F103 available from Schlumberger, at a concentration ranging from about 2000 to about 5000 ppm. This particular surfactant comprises from 10 to 30 weight percent 2-butoxyethanol, from 1 to 30 weight percent propan-2-ol, and from 5 to 10 weight percent of each of three different Schlumberger proprietary ethoxylated linear alcohols; a pH of 5 at concentration of 10 g/l; a boiling point of 88° C.; a flash point of 32° C. (Pensky-Martens CC); a relative density of 0.9 at 25° C.; a vapor pressure of 3.4 kPa at 25° C.; and a viscosity of 5.3 mPa-s at 40° C. In this method, production was stopped, and water was injected into the reservoir via the production tubing. The well was then put back on production. The gas production carried the injected water and additive back into the wellbore over a period of time; keeping the tubing "water wet" and clear of sulfur deposits.

The first water push was carried out on day 1 where a volume of 100 m$^3$ (628 BBL) of water and additive as described was pumped into the well and displaced into the formation with a volume of nitrogen. Following the water injection, the well began to produce at the selected rate of approximately 230 $e^3$ m$^3$/day (8 MMscf/day) and continued for 12 days prior to showing evidence of sulfur depositing on the tubing wall. This behavior proved that water assists in wetting the tubing and prolongs the onset of the deposition mechanism. Prior to commencing the water push, a DMDS treatment was performed to ensure the tubing was clean.

A second water push was carried out 16 days later where a volume of 101 m3 (635 BBL) of water containing the same additive in the same concentration was pumped into the well and displaced into the formation with a volume of nitrogen. After the water was injected, the well was brought back online at 230 $e^3$ m$^3$/day (8 MMscf/day) and then the rate was eventually ramped up to approximately 336 $e^3$ m$^3$/day (12 MMscf/day). Production continued for a time period of 23 days at this flow rate.

A third water push was carried out 23 days after the second water push. A volume of 100 m$^3$ (628 BBL) of water, with no additives, was pumped into the well and displaced into the formation with nitrogen. After the water was injected, the well was brought back on-line online at 230 $e^3$ m$^3$/day (8 MMscf/day) and then the rate was eventually ramped up to approximately 400 $e^3$ m$^3$/day (14 MMscf/day). Production continued for a time period of 37 days at this flow rate.

A fourth water push was carried out 37 days after the third water push. A volume of 100 m$^3$ (628 BBL) of water, with no additives, was pumped into the well and displaced into the formation with nitrogen. After the water was injected, the well was brought back on-line online at 230 $e^3$ m$^3$/day (8 MMscf/day) and then the rate was eventually ramped up to approximately 340 $e^3$ m$^3$/day (12 MMscf/day). Production will be continued until another water push is indicated.

DMDS solvent wash treatments, performed to clean out elemental sulfur deposition from the production tubing, have not been necessary since prior to the first water push at this well and reservoir.

From the foregoing detailed description of specific embodiments, it should be apparent that patentable methods and compositions have been described. Although specific embodiments of the disclosure have been described herein in some detail, this has been done solely for the purposes of describing various features and aspects of the methods and compositions, and is not intended to be limiting with respect to the scope of the method and compositions. It is contemplated that various substitutions, alterations, and/or modifications, including but not limited to those implementation variations which may have been suggested herein, may be made to the described embodiments without departing from the scope of the appended claims. For example, various optional ingredients may be utilized, and variations in the viscosity, odor, color, consistency, pH, and the like are considered within the disclosure.

What is claimed is:

1. A method of producing a sour hydrocarbon gas from a reservoir, the method comprising:
    a) injecting an aqueous composition consisting essentially of water into a well within the reservoir so as to contact at least a portion of the reservoir with the aqueous composition, the well having production tubing, and the reservoir comprising hydrocarbons and sulfur compounds;
    b) injecting an inert gas into the well to force the aqueous composition further into the reservoir;
    c) producing at least some of the hydrocarbons and sulfur compounds mixed with the aqueous composition from the reservoir; and
    d) repeating (a) through (c) wherein the aqueous composition consists of only water and no additives, the aqueous composition consisting of only water and no additives wetting the production tubing and preventing substantial deposition of elemental sulfur on the production tubing.

2. The method of claim 1 wherein the inert gas comprises gaseous nitrogen.

3. The method of claim 1 wherein (c) occurs in two or more sub-steps where the well is brought back online at a first flow rate, and then the flow rate is ramped up.

4. The method of claim 1, further comprising injecting an organic or inorganic solvent into the well within the reservoir prior to (a).

5. The method in accordance with claim 1 wherein the producing is carried out at conditions sufficient to produce a water-saturated hydrocarbon gas stream with entrained liquid water.

6. The method in accordance with claim 1 comprising shutting in the reservoir after (b).

7. The method in accordance with claim 1, further comprising monitoring the hydrocarbon gas being produced for one or more indications of elemental sulfur being deposited on the production tubing after (c).

8. The method in accordance with claim 1 wherein (a) comprises injecting the aqueous composition into the well through the production tubing, the annulus, or combinations thereof.

9. The method in accordance with claim 1 wherein the production tubing comprises one or more mandrels and wherein (a) comprises injecting the aqueous composition into the well through the one or more mandrels.

10. The method in accordance with claim 1 wherein the temperature of the aqueous composition is at least high enough during the contacting to prevent hydrate formation.

11. The method in accordance with claim 1 wherein the reservoir has a temperature above the melting point of sulfur, and the aqueous composition has a surface injection temperature high enough so that when the composition reaches the reservoir, the temperature of the aqueous composition upon contact with the production tubing is above the melting point of sulfur to prevent freezing of elemental sulfur, and so that the water will mobilize any liquid sulfur and push it back further into the reservoir.

12. The method of claim 2 wherein the gaseous nitrogen is produced onsite using an onsite nitrogen generator.

13. The method of claim 2 comprising delivering liquid nitrogen to a well location in a cryogenic pressurized tank, either on a pump truck itself or brought out in a separate bulker, and feeding the liquid nitrogen into a liquid nitrogen pumping unit to pressurize and move the liquid through a heating device to produce the gaseous nitrogen.

14. The method of claim 1 wherein the aqueous composition in (a) comprises one or more additives.

15. The method of claim 14 wherein the one or more additives comprises a surfactant, an alkali salt, or combinations thereof.

* * * * *